(12) United States Patent
Mason, Jr. et al.

(10) Patent No.: US 10,796,251 B2
(45) Date of Patent: *Oct. 6, 2020

(54) SYSTEM AND METHOD FOR MOBILE SOCIAL NETWORKING WITHIN A TARGET AREA

(71) Applicant: Capital One Services, LLC, McLean, VA (US)

(72) Inventors: Frederick Joel Mason, Jr., Richmond, VA (US); Donald Jeffrey Smith, Richmond, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/407,477

(22) Filed: May 9, 2019

(65) Prior Publication Data
US 2019/0266524 A1   Aug. 29, 2019

Related U.S. Application Data

(63) Continuation of application No. 15/791,511, filed on Oct. 24, 2017, now Pat. No. 10,366,355, which is a (Continued)

(51) Int. Cl.
| | |
|---|---|
| *G06Q 10/04* | (2012.01) |
| *G06Q 50/00* | (2012.01) |
| *H04L 29/08* | (2006.01) |
| *H04W 4/021* | (2018.01) |
| *H04W 4/06* | (2009.01) |

(Continued)

(52) U.S. Cl.
CPC ............. *G06Q 10/04* (2013.01); *G06Q 50/01* (2013.01); *H04L 67/306* (2013.01); *H04W 4/021* (2013.01); *H04W 4/06* (2013.01); *H04W 4/21* (2018.02); *H04W 12/08* (2013.01); *G01S 1/02* (2013.01); *H04L 29/08981* (2013.01); *H04L 63/107* (2013.01); *H04W 4/029* (2018.02); *H04W 12/00503* (2019.01)

(58) Field of Classification Search
CPC ......... G06Q 10/04; G06Q 50/01; H04W 4/21; H04W 4/021; H04W 4/06; H04W 12/00; H04L 67/306; H04L 29/08981; G01S 1/02
USPC .................................................. 709/217–219
See application file for complete search history.

(56) References Cited

U.S. PATENT DOCUMENTS

| | | |
|---|---|---|
| 7,386,464 B2 | 6/2008 | Robertson et al. |
| 8,060,463 B1 | 11/2011 | Spiegel |

(Continued)

*Primary Examiner* — Joseph L Greene
(74) *Attorney, Agent, or Firm* — Troutman Pepper Hamilton Sanders LLP; Christopher J. Forstner; Brennan M. Carmody

(57) ABSTRACT

A system and method for mobile social networking within a target area are provided. The method provides for mobile social networking. The method includes receiving a social networking profile, and a target area. The social networking profile has at least one user preference. The method also includes broadcasting the social networking profile to one or more members of the social network within the target area. The method further includes searching within the target area for the one or more members having a preference that is the same or similar to the at least one user preference. The method additionally includes enabling contact with the one or more members having the same or similar at least one user preference.

20 Claims, 6 Drawing Sheets

Related U.S. Application Data continuation of application No. 12/039,057, filed on Feb. 28, 2008, now Pat. No. 9,830,562.

(51) Int. Cl.

| | | |
|---|---|---|
| *H04W 4/21* | (2018.01) | |
| *H04W 12/08* | (2009.01) | |
| *H04W 4/029* | (2018.01) | |
| *H04L 29/06* | (2006.01) | |
| *H04W 12/00* | (2009.01) | |
| *G01S 1/02* | (2010.01) | |

(56) References Cited

U.S. PATENT DOCUMENTS

| | | |
|---|---|---|
| 2002/0046259 A1 | 4/2002 | Glorikian |
| 2005/0197846 A1 | 9/2005 | Pezaris et al. |
| 2005/0198305 A1 | 9/2005 | Pezaris et al. |
| 2005/0272413 A1 | 12/2005 | Bourne |
| 2006/0064346 A1 | 3/2006 | Steenstra et al. |
| 2006/0195442 A1 | 8/2006 | Cone et al. |
| 2007/0005419 A1* | 1/2007 | Horvitz ............... G06Q 30/02 701/533 |
| 2007/0030824 A1 | 2/2007 | Ribaudo et al. |
| 2007/0117576 A1 | 5/2007 | Huston |
| 2007/0150607 A1 | 6/2007 | Flinchem et al. |
| 2007/0186007 A1* | 8/2007 | Field ..................... G06Q 30/02 709/233 |
| 2007/0233367 A1 | 10/2007 | Chen et al. |
| 2007/0255831 A1 | 11/2007 | Hayashi et al. |
| 2007/0281690 A1 | 12/2007 | Altman et al. |
| 2007/0282621 A1 | 12/2007 | Altman et al. |
| 2008/0102856 A1 | 5/2008 | Fortescue et al. |
| 2008/0195664 A1 | 8/2008 | Maharajh et al. |
| 2009/0176509 A1 | 7/2009 | Davis et al. |
| 2011/0210816 A1 | 9/2011 | Wang |
| 2012/0190386 A1 | 7/2012 | Anderson |

\* cited by examiner

SYSTEM AND METHOD FOR MOBILE SOCIAL NETWORKING WITHIN A TARGET AREA

CROSS REFERENCE TO RELATED APPLICATIONS

This application is a continuation of, and claims priority under 35 U.S.C. § 120 to, U.S. patent application Ser. No. 15/791,511, filed Oct. 24, 2017, which is a continuation of U.S. patent application Ser. No. 12/039,057, filed Feb. 28, 2008, now U.S. Pat. No. 9,830,562, the entire contents of which are fully incorporated herein by reference in their entireties.

FIELD

The present invention relates to a system and method for mobile social networking within a target area.

BACKGROUND

Significant changes have occurred in how individuals network and associate with each other. Traditionally, personal and professional networking generally involved one or more people meeting face-to-face and engaging in a conversation to determine whether the parties have the same or similar personal or professional interests. However, over the years personal and professional networking has evolved to allow people to use social networks, such as MySpace (www.myspace.com), and Facebook (www.facebook.com), to interact and socially network using the Internet. Both forms of social networks have disadvantages. For example, locating people having the same or similar personal or professional interests can take a significant amount of time and effort. In particular, locating a person with the same or similar interests in a large group of people or on a social networking website can be a rather daunting task. Also, there is added difficult when a person is looking to network with others within the general vicinity of that person's current location.

Overall, these conventional forms of social networking fail to provide an effective and efficient way for businesses, individuals, and/or service providers to socially network with other businesses, individuals and/or service providers.

These and other drawbacks exist with current systems.

SUMMARY

Various exemplary embodiments provide for systems and methods for mobile social networking within a target area. A mobile device includes a processor, a memory, a broadcast module, and a search module. The processor may run an executable application. The executable application can receive a social networking profile, and a target area. The social networking profile may include at least one user preference. The memory may store the social networking profile and the target area. The memory may be in communication with the processor. The broadcast module may broadcast the social networking profile to one or more members of a social network within the target area. The search module may search within the target area for the one or more members having a preference that is the same or similar to the at least one user preference.

Various exemplary embodiments also provide for a method for mobile social networking within a target area. The method includes receiving a social networking profile, and a target area. The social networking profile has at least one user preference. The method also includes broadcasting the social networking profile to one or more members of the social network within the target area. The method further includes searching within the target area for the one or more members having a preference that is the same or similar to the at least one user preference. The method additionally includes enabling contact with the one or more members having the same or similar at least one user preference.

Other embodiments may also be considered.

BRIEF DESCRIPTION OF THE DRAWINGS

The embodiments of the present disclosure, together with further objects and advantages, may best be understood by reference to the following description taken in conjunction with the accompanying drawings, in the several Figures of which like reference numerals identify like elements, and in which.

DETAILED DESCRIPTION

Figure 1:
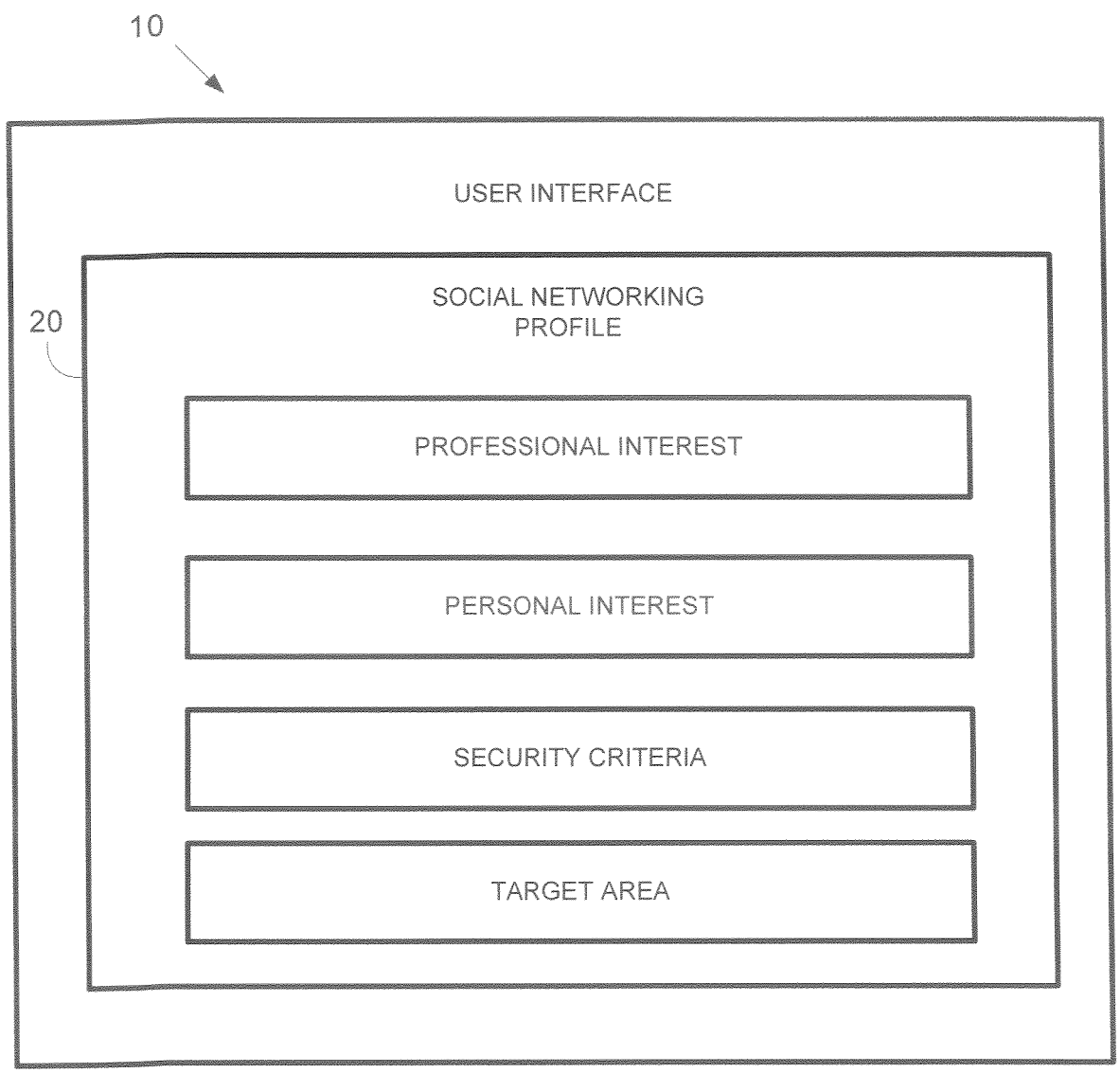
FIG. 1 depicts an exemplary user interface according to various embodiments of the disclosure.

The following description is intended to convey a thorough understanding of the embodiments described by providing a number of specific embodiments and details involving systems and methods for mobile social networking within a target area. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending on specific design and other needs.

Various exemplary embodiments provide for mobile social networking within a target area.

Exemplary embodiments of the systems and methods for mobile social networking within a target area provide an improvement over more conventional forms of social networking, which includes web-based social networking sites such as Myspace and Facebook. The systems and methods of the present disclosure provide a more efficient and effective way for businesses, individuals, and/or service providers to automatically locate and socially network with other businesses, individuals, and/or service providers.

In particular, various embodiments of the present disclosure provide a social networking environment where a mobile device user may electronically and/or automatically locate and socially network with other businesses, individuals, and service providers that are within a target area and have the same or similar personal and/or professional interests as the user. As used herein, a user generally refers to any business, individual, service provider, and/or anyone or anything capable of using a mobile device. Also, as used herein, the term member may include any business, individual, service provider, and/or anyone or anything that may be a member of the social network and capable of using a mobile device. Embodiments of the present invention may provide for social networking using at least the mobile device, global positioning system and/or Internet-based technology, a software executable application (e.g. Myspace, Facebook, etc.), and a target area.

The systems and methods described herein enable a mobile device user to broadcast to, search for, contact and/or locate one or more members of a social network within a target area. For example, exemplary embodiments of the present disclosure may enable a mobile device user to broadcast a social networking profile (i.e. personal interest, professional interest, etc.) to one or more members of the social network that are within the target area. The mobile device user may also search for the one or more members of the social network that are within the target area that may have the same or similar preferences as the mobile device user. The mobile device user may also contact and locate the one or more members of the social network having the same or similar preferences as the user.

Exemplary embodiments of the present disclosure may provide for a social networking environment where the mobile device user may define a social networking profile and a target area. The mobile device user may define the social networking profile and the target area using a user interface akin to, for example, a Facebook or MySpace user interface. The social networking profile, as described below, may include the mobile device user's preferences which include personal and professional information. For example, the mobile device user may enter into a user interface that their personal interests include whale watching and bass fishing and professional interests include hedge funds and the stock market. The target area, as described below, may include a certain scope, area or region, or a geographical distance or proximity. The mobile device user may enter into the user interface that the target area may include the city of Las Vegas, Nev. It should be appreciated that the user may define the social networking profile and the target area using a user interface that is not limited to an Internet-based user interface. Additionally, the user may define the social networking profile and target area directly using the mobile device.

Exemplary embodiments of the present invention may also allow the mobile device user to broadcast the social networking profile to one or more members of the social network that are within a target area, and have the same or similar preferences as the user. For example, a cell phone user may be interested in meeting one or more members of the social network that currently has a layover at Washington Dulles Airport, and that are interested in Tai Chi. The cell phone user may broadcast their social networking profile to other members of the social network that currently have a layover at Washington Dulles Airport and are interested in Tai Chi. The social networking profile broadcast by the cell phone users may be compared to a search of the one or more members of the social network to determine if the cell phone user and the one or more members have the same or similar personal or professional interest. The cell phone user may be contacted by the one or more members and/or receive a notification on the cell phone that the one or more members that have the same or similar interest has been found. The user may receive the notification if the one or more members are within the target area of Washington Dulles Airport, and are also interested in meeting other members of the social network currently having a layover in Dulles and interested in Tai Chi.

Exemplary Embodiments of the present invention may also provide a social networking environment where the mobile device user may search for one or more members of the social network that are within the target area and have the same or similar preferences as the user. The mobile device user may use the same mechanism used for broadcasting in order search for one or more members of the social network having the same or similar interest. Also, the search may be performed using the same social networking profile and target area that is used to broadcast. For example, a cell phone user may be interested in searching for members of the social network that want to attend a wine tasting event this evening at a local winery. The search may be sent from the cell phone to locate the one or more members of the social network interested in attending the wine tasting event. The search request may be compared to a social networking profile broadcast by the one or more members to determine if their personal and professional interest are the same or similar. If the one or more members social networking profile includes that the one or more members is interested locating people attending the wine tasting event, the cell phone user may receive a notification on their cell phone indicting that the one or more members having the same or similar personal or professional interest has been found within the target area. The notification may include contact information of the one or more members, and the user may contact the one or more members.

In another example, a bakery may use a mobile device to broadcast a social networking profile indicating that the store will be selling free pastries to the next 10 customer who enter the store. The target area may include 5 blocks of the stored current location. The social networking profile broadcast sent from bakery's mobile device may be compared to a search of the one or more members of the social network that are within 5 blocks of the store. If the one or more members search includes that the one or more members are interested in locating free pastries, the one or more members may receive a notification of the bakery's free pastry special. The one or more members may also receive contact information for the bakery. The one or more members may contact the bakery to receive directions or any other information sufficient to locate the bakery.

As described above, socially networking with the one or more members may require that the one or more members also have a mobile device. The mobile device of the one or more members may function similarly as the mobile device as described in the present disclosure. Additionally, the one or more members may perform the same steps performed by the user to use the mobile device. For example, one or more members may use a mobile device to search for a painting business within a 2-mile radius of the one or more members current location. The one or more members may also receive the social networking profile broadcast by the user when the users' broadcast is encompassed within the scope of the one or more members 2-mile radius, and the users social networking profile indicates that the user is in the painting business.

In an exemplary embodiment, a cell phone user may enter in a Myspace like user interface a social networking profile that includes the user's professional interest of antitrust law and the user's personal interest of hiking. The cell phone user may also indicate that the target area for broadcasting and searching may be 2 miles of the cell phone user's current location. The cell phone user may activate a broadcasting function and searching function on the cell phone using the social networking environment. The cell phone may then continuously broadcast the users social networking profile to one or more members of the social network that are within 2 miles of the user's current location, and that have the same or similar personal or professional interest as the user. The cell phone may also use the social networking profile to continuously search for the one or more members of the social network that are within 2 miles of the user's current location, and that have the same or similar personal and professional interest.

An aggregator associated with the user's cell phone may compare the users broadcast against the search of the one or more members of the social network. The aggregator may also compare the users search against a broadcast of the one or more members of the social network. As described in more detail below, the aggregator may analyze the information received in the broadcast against the information received in the search to find a match in the preferences (i.e. personal and professional interest) between the user and the one or more members. If the aggregator analyzes the social networking profile of the one or more members and determines that the one or more members has at least a personal interest in hiking, or a professional interest in antitrust law, the cell phone user may receive a notification. The notification may include contact information of the one or more members and/or an indication that the one or more members has been found. Both the cell phone user and the one or more members of the social network may subsequently contact each other.

As described above, to engage in social networking the mobile device user may provide a social networking profile. The social networking profile may include information about the user. This social networking profile may include user preferences. The user preferences may include but are not limited to personal information, professional information, security information, location information, and the target area. The personal information may include medical information, health information, personal interests, products of ownership and of interest, contact criteria and information, friends, sex, hometown, sports played, references, religious beliefs, affiliations, picture of the user, favorite poetry, favorite music, favorite art, or any information that would similarly be relevant to social or personal networking. The professional information may include business name, business profile, products and service offerings, specials hours of operations, reference of product services or any other information relevant in social or professional networking.

The social networking profile may include security criteria. The security criteria may be turned on and off by the user. The security criteria may include determining the user's preferences regarding whom and where the social networking profile will be broadcast, the extent of the social networking profile broadcast, the extent of the user search, who can contact the user, the type of contact information one or more members can receive to contact the user, and any other types of security information. The user may determine that one or more members interested in contacting the user may only contact the user using a limited form of communication. For example, the user may limit contact from the one or more members having the same or a similar preference to email communication, thereby preventing communication using a text message or a telephone call.

Also, the mobile device user may provide a target area. The target area may be included within the social networking profile. The target area may include the current location of the user, a previous location of the user, a future location of the user, and/or the location of the one or more members. The target area may include a geographical distance or proximity or, a region or area that may determine the extent that the social networking profile may be broadcast. Additionally, the target area may also determine the extent to which the mobile device user may search for the one or more members having the same or similar preference as the user. The target area may be limited by a numerical distance, a landmark, a location, or anything else that may be used to provide physical limitations or constraints. In various embodiments, the target area may be defined or determined by the mobile device user thereby providing a user-defined or self-defined radius.

The target area may also include an area within a radius of the user's current location. For example, the target area may be limited to a distance of 200 yards from the user's current location. The scope of the target area may generally be determined based on the user's current location. For example, the user may have defined that the target area may be a 5 miles radius of the user's current location. When the user is stagnant, the scope of the target area may encompass 5 miles of the user's current location or position. However, if the user is moving then the scope of the target area may constantly change in real time and encompass 5 miles of the users moving location or position. This may result in the social networking profile being continuously broadcast as the user moves and the scope of the target area changes.

The current location of the mobile device may be determine using many different technologies such as GPS technology, Internet-based technology, etc. In an exemplary embodiment, the current location of the mobile device user may include of the mobile device user's specific coordinates (latitude and longitude, etc.) of the mobile device user. The specific coordinates may be used to determine an address for the mobile device user's current location. This particular address may be determined using the Internet and/or a database of information that associates geographic coordinates with address information. For example, it may be determined that the specific coordinates correspond with the mobile device user's current location as being located at 1000 Broadway Ave, New York, N.Y. Further, the mobile device user's coordinates and/or address may also be used to determine the scope of the target area. For example, the target area may be 2 miles of the user's current location. The scope of the target area may then encompass 2 miles of the specific coordinates of the user and/or 1000 Broadway Ave, New York, N.Y. The scope of the target area may change as the user moves. For example, the scope of the target area may change from encompassing 2 miles of the specific coordinates of the user and/or 1000 Broadway Ave to encompassing 2 miles from the specific coordinates of the user and/or 2000 Broadway Ave.

The current location may also be determined using Internet-based technology. For example, a website may be accessed that determines the location of the one or more members relative to the location of the user. Also, the Internet-based technology may be used in conjunction with the GPS based technology. For example, GPS based technology may determine the coordinates of the user, and the Internet-based technology may determine one or more members within the target area. The mobile device of the present disclosure may also use Internet-based technology to determine the user's current location in real-time with immediate updates as the user and the mobile device 102 are moved.

Referring now to the Figures, FIG. 1 depicts an exemplary user interface 10 according to various embodiments of the disclosure. As described above, the user interface 10 may be akin to a conventional social networking user interface such as MySpace or Facebook. In various embodiments, the user interface 10 may be an add-on to MySpace or Facebook. Also, as described above, mobile device user may use the user interface 10 to provide the social networking profile 20 and any other information that may be relevant in social networking.

The user may enter a social networking website and be prompted to enter in a username and password. Alternatively, a username and password may not be required. The user may be prompted to by the user interface 10 to define their social networking profile 20. The user may define personal and professional interest, security criteria and target area. The user may enter in their social networking profile 20, or any other information relevant to social networking.

The user may provide the social networking profile 20 using the mobile device or any other device that may be used to enter information, such as a personal computer. The user also may provide the social networking profile 20 and the target area using an executable application, such as a software executable application, a customized application, a non-customized application, or the like. Regardless of the mechanism used, the social networking profile and the target area may be provided to the mobile device or an executable application running on the mobile device. In some embodiments, the social networking profile and the target area may be stored on the mobile device. The social networking profile and the target area may also be associated with a mobile device number, a mobile device locator, and the like.

Figure 2:
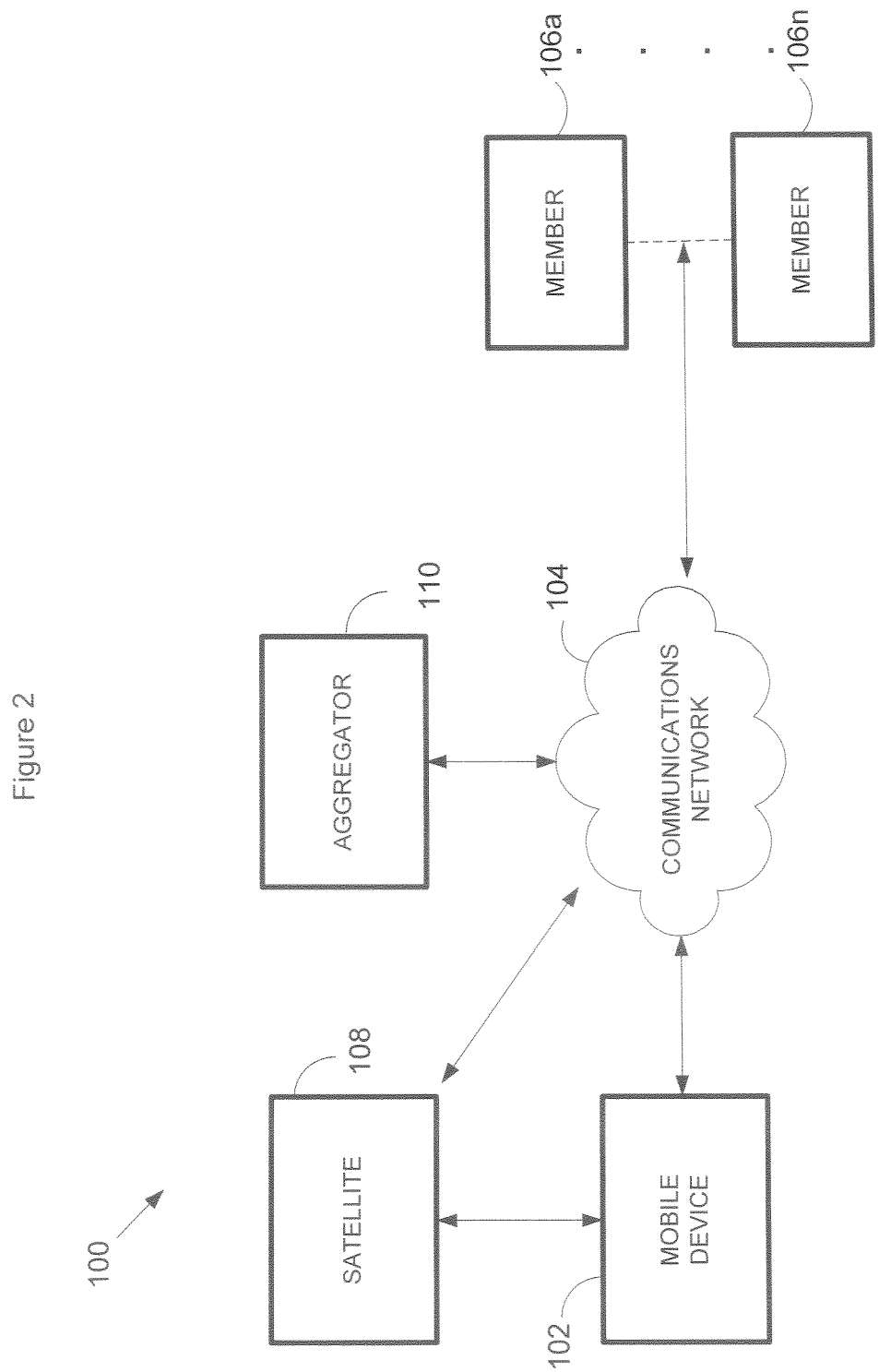
FIG. 2 depicts an exemplary embodiment of a system for mobile social networking within a target area according to at least one embodiment of the disclosure.

FIG. 2 depicts an exemplary embodiment of a system 100 for mobile social networking within a target area according to at least one embodiment of the disclosure. The exemplary system 100 includes a mobile device 102, a communications network 104, one or more members 106a-106n, a satellite 108, and an aggregator 110. The mobile device 102 may allow a user to socially network with the one or more members 106a-106n over the communications network 104.

The mobile device 102 may be a cellular phone, wireless device, GPS enabled device, or any device that may be used for social networking. The mobile device 102 may be coupled to the communications network 104 to broadcast the social networking profile. The mobile device 102 may also be coupled to the communications network 104 to search for one or more members 106a-106n. The mobile device 102 may also be coupled to the communications network 104 to contact the one or more members 106a-106n. Additionally, the mobile device 102 may be coupled to the communications network 104 to locate the one or more members 106a-106n. In various embodiments, the mobile device 102 may be coupled to the communications network 104 to obtain the current location of the user. The mobile device 102 may interact with the satellite 108 to determine the current location of the mobile device user. Also, the mobile device 102 may facilitate communication with the communications network 104, the one or more members 106a-106n, the satellite 108, and the aggregator 110 using a software application.

The satellite 108 may be a geosynchronous satellite, an asynchronous, a GPS satellite, or any other satellite that may be used to communication over a communications network. The satellite 108 may interact with the mobile device 102 to provide the current location of the user. The satellite may interact with the mobile device over the communications network 104. The satellite 108 may communicate with the aggregator 110 over the communications network 104 to enable the aggregator 110 to determine the scope of the target area. The satellite 108 may also enable the aggregator 110 to determine the location of the one or more members 106a-106n relative to the mobile device 102

The one or more members 106a-106n may also have a mobile device that functions similarly as the mobile device 102 described above. The one or more members 106a-106n may be coupled to the communications network 104 to broadcast the one or more members 106a-106n social networking profile. The one or more members 106a-106n may also be coupled to the communications network 104 to search for the mobile device user or other members of the social network. The one or more members 106a-106n may also be coupled to the communications network 104 to contact the mobile device user or other members of the social network. Additionally, the one or more members 106a-106n may be coupled to the communications network 104 to locate the mobile device user or other members of the social network.

The aggregator 110 may be implemented using hardware, software firmware, manual processing, or any combination thereof. A software implementation represents program code that performs a specific task when executed on a computing-based processor. In particular, the aggregator 110 may be implemented as computer executable instructions. In various embodiments, the aggregator 110 may be a hardware attached to or a software application that may be run on the communications network. The aggregator 110 may also be hardware attached to or a software application that may be run on the communications network. It should be understood that the aggregator 110 may be implemented directly on the mobile device.

The aggregator 110 may be coupled to the communications network 104 to receive the broadcast social networking profile. The aggregator 110 may be coupled to the communications network 104 to receive the target area. The aggregator 110 may also be coupled to the communications network 104 to receive any additional information relevant to social networking such as security criteria. The aggregator 110 may also be coupled to the communications network 104 to receive the search request. In some embodiments, the aggregator 110 may store the social networking profile. Additionally, the aggregator 110 may receive information about the mobile device 102, such as a phone number, or a mobile device locator, to associate a location with a stored social networking profile. The aggregator 110 may be capable of tracking and/or locating the mobile device user using the information received about the mobile device 102.

Figure 3:
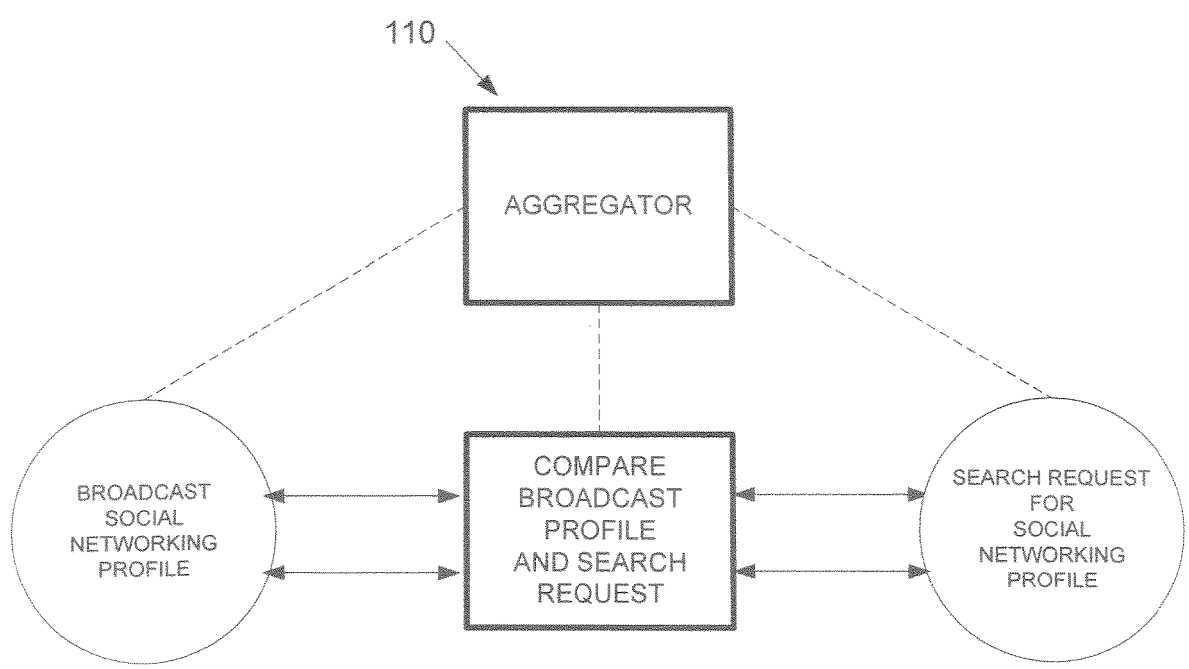
FIG. 3 depicts an exemplary aggregator according to various embodiments of the disclosure.

As illustrated in FIG. 3, the aggregator 110 is operable to compare the broadcast social networking profile and the search request to determine whether the social networking profile and search request include the same or similar user preferences. The aggregator 110 may use software-based instructions, or algorithms to compare the broadcast and the search request. The aggregator may be operable to compare and match the broadcast and search request in advance or in real-time.

The communications network 104 may be any network sufficient to allow communication between the one or more members 106a-106n. The communications network 104 may facilitate communication between the user of the mobile device 102 and the one or more members 106a-106n.

The components depicted in FIG. 2 may be coupled via one or more networks. As referred to herein, a network may include, but is not limited to: e.g., a wide area network (WAN), a local area network (LAN), a global network such as the Internet, a telephone network such as a public switch telephone network, a wireless communication network, a cellular network, an intranet, a satellite network, a GPS network, or the like, or any combination thereof. In exemplary embodiments, the network may include one, or any number of the exemplary types of networks mentioned above, operating as a stand-alone network or in cooperation with each other. Use of the term network herein is not intended to limit the network to a single network. The components depicted in FIG. 2 may communicate by electronic transmission through the one or more networks mentioned above, by physical delivery, or by any other communication mechanism. Communication between two components depicted in FIG. 2 may also include communication with any other entities between the two components.

Exemplary system 100 for mobile social networking using may include one or more network-enabled computers to process interaction between the mobile device 102, communication network 104, the one or more members 106a-106n, the satellite 108, and the aggregator 110. As referred to herein, a network-enabled computer may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The one or more network-enabled computers of exemplary system 100 may execute one or more software applications to, for example, receive data as input from an entity accessing the network-enabled computer, process received data, transmit data over a network, and receive data over a network. The one or more network-enabled computers may also include one or more software applications to enable the processing of a card transaction.

Figure 4:
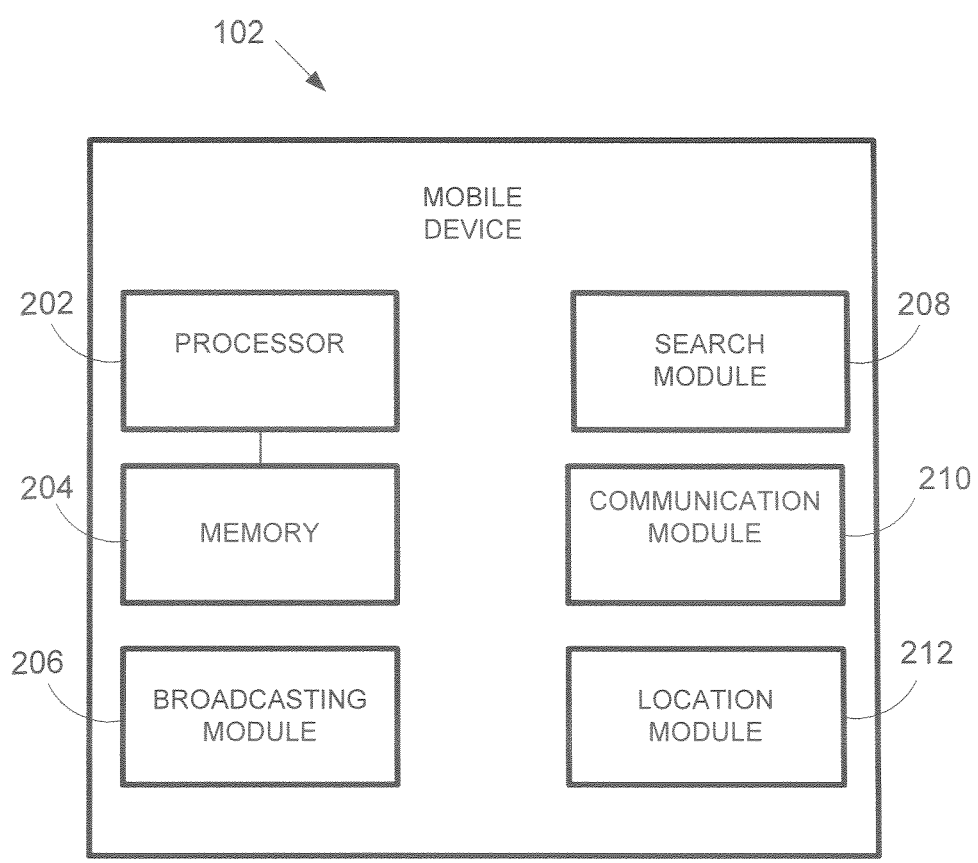
FIG. 4 depicts an exemplary mobile device according to various embodiments of the disclosure.

FIG. 4 depicts an exemplary mobile device 102 according to various embodiments of the disclosure. The mobile device 102 may include a processor 202, a memory 204, a broadcast module 206, a search module 208, a communication module 210, and a location module 212.

The processor 202 may run an executable application. The executable application may communicate over a communications network to receive the social networking profile and a target area. The executable application may communicate the social networking profile and the target area to memory 204, and the broadcast module 206. The executable application may also function as the user interface 10. The executable application may receive commands from the mobile device user to activate certain features or modules of the mobile device. The executable application may initiate and/or communicate a command from the mobile device user to operate the appropriate module. The executable application may communicate with the social networking environment over the communications network 104. The executable application may perform some, none, or all of the functions of the mobile device 102.

The processor 202 may be in consistent and/or continuous contact with the aggregator 110. The processor 202 may process data associated with the user or the one or more members 106a-106n and execute any of a software module or a executable software program, and cause data to be stored. The operation of the processor 202 may include executing software or coded instructions that may in particular embodiments be associated with the one or more function modules.

The memory 204 may be in communication with the processor 202. The memory 204 may receive the social networking profile and target area from the processor 202 and store the social networking profile and the target area. The memory 204 may be in a variety of forms that are able to hold data, instructions, or other information associated with the mobile device 102. The memory 204 may include a database to store data electronically. The memory 204 may be read by the processor 202 or any other aspect of the mobile device 102.

The memory 204 may be coupled to the processor 202 and may include one or more suitable memory devices, such as one or more random access memories (RAMs), read-only memories (ROMs), dynamic random access memories (DRAMs), fast cycle RAMs (FCRAMs), static RAM (SRAMs), field-programmable gate arrays (FPGAs), erasable programmable read-only memories (EPROMs), electrically erasable programmable read-only memories (EEPROMs), microcontrollers, or microprocessors.

The broadcast module 206 may receive the social networking profile and the target area from the processor 202 and/or the memory 204. The broadcast module 206 may broadcast the social networking profile to the one or more members 106a-106n of the social network within the target area over the communications network 104. The broadcast module may interact with the satellite 108 to transmit and receive information related to the user's current location. The broadcast module may interact with the aggregator 110 over the communications network 104 to provide the social networking profile and the target area. The broadcast module 206 may be an antenna, a processor, or any other device capable of transmitting signals over the communications network 104. The broadcast module 206 may also function as similarly as the search module 208.

The search module 208 may search within the target area for the one or more members 106a-106n having a preference that is the same or similar to the preference of the user over the communications network 104. The search module may receive the social networking profile, the target area, and a search request from the processor 202 and/or the memory 204. The search module 208 may send the social networking profile, and search request over the communications network 104. The search module 208 may communicate with the aggregator 110 over the communications network to provide the social networking profile, the search criteria, and the target area. The search module 208 may be an antenna, a processor, or any other device capable of transmitting signals over the communications network 104. The search module 208 and the broadcast module 206 may be the same module or may function similarly.

The communication module 210 may contact the one or more members 106a-106n having the same or similar preferences over the communications network 104. The communications module 210 may interact with the aggregator 110 over the communications network 104 to receive a notification that the one or members 106a-106n have been found. The communication module 210 may also interact with the processor 202 and/or memory 204 to provide any information receive about the one or more members 106a-106n. The communications module 210 may contact the one or more members 106a-106n. The communication module may be capable of initiating or receiving a text message, a telephone call, an email, or any other form of communication. The communication module 210 may also send a communication to the user that the one or more members 106a-106n are within the target area. The communication module 210 may receive a notification from the broadcast module 206 and/or the search module 208 that the one or more members 106a-106n are within the target area. The communication module 210 may be anything capable of receiving and initiating communicating over the communications network 210.

The location module 212 may locate the one or more members 106a-106n having the same or similar preferences as the user over the communications network 104. The location module 212 may receive information sufficient to locate the one or more members 106a-106n from the processor 202, memory 204, broadcasting module 206, aggregator 210, and/or search module 208. In particular, the location module 212 may communicate with the processor 202 and/or memory 204 to receive an electronic guide, directions, or a map to the one or more members 106a-106n. The location module 212 may be anything that may allow the user to locate the one or more members 106a-106n.

Figure 5:
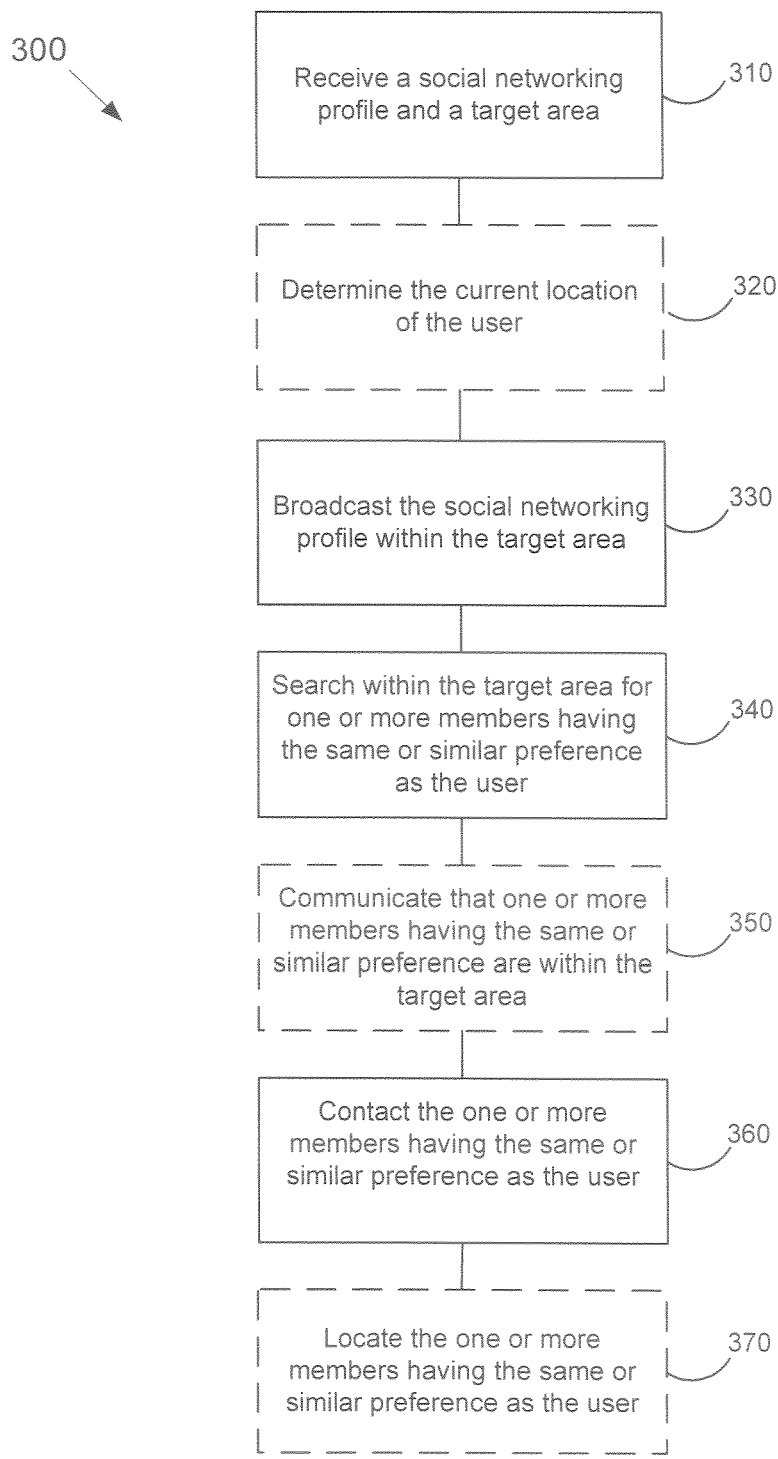
FIG. 5 depicts an exemplary flow chart which illustrates an exemplary method for mobile social networking within a target area according to various embodiments of the disclosure.

FIG. 5 depicts an exemplary flow chart which illustrates an exemplary method 300 for mobile social networking within a target area according to various embodiments of the disclosure.

At block 310, a social networking profile, and a user-defined radius may be received. The social networking profile, and target area may be received by the mobile device 102. The social networking profile and the target area may be received through any kind of physical or non-physical channel. As described above, the social networking profile, and the target area may be provided to the mobile device 102 using an executable application or user interface.

Optionally, at block 320, the current location of the user may be determined. As described above, the current location of the user may be determined using GPS technology or Internet technology. The current location of the user may also be determined by tracking the users cell phone use or any other tracking use, a wireless access point, a cell phone tower, or any other mobile device tracking technology. The scope of the target area may also be determined by using the user's current location. The target area may be evaluated to limit the scope of the broadcast, the search and to determine whether one or more members 106a-106n are within the target area.

At step 330, the social networking profile may be broadcast to one or more members 106a-106n within the target area. The social networking profile may include the at least one user preference. As described above, the social networking profile may be broadcast using the mobile device 102. At step 340, one or more members 106a-106n having a preference that is the same or similar to the at least one user preference may be searched for within the target area. The user may use the mobile device 102 to search for the one or more members 106a-106n having a preference that is the same or similar to a user preference.

The user may search for the one or more members 106a-106n simultaneously with broadcasting, before or after broadcasting. Additionally, the user may opt not to search for the one or more members 106a-106n, but only broadcast the social networking profile. Also, the user may opt not to broadcast, but only search for the one or more members 106a-106n. The social networking profile that may be used to search for the one or more members 106a-106n may be the same social networking profile that is provided by the user. The social networking profile that may be used to search for the one or more members 106a-106n may be supplemented by additional information. For example, the user preference may indicate that the user is interested in locating individuals within the target area that are interested in a particular personal interest. The user may supplement that user preference by indicating at the time of search that the user is interested in locating one or more members 106a-106n that are interested in both the particular personal interest and a particular professional interest.

Optionally, at step 350, a communication is received that the one or more members 106a-106n having the same or similar at least one user preference are within the target area. The communication may come from the mobile device 102, the one or more members 106a-106n, or in any other way to notify the user that one or more members 106a-106n having the same or similar preference is within the user-defined radius. The communication may be in any way, including, for example, a written document, a notification, an alert, electronic message, telephone message, e-mail, text message, instant message, or any other notification mechanism. The user may also contact the one or more members 106a-106n.

At step 360, the one or more members 106a-106n having the same or similar preference as the user may be contacted. The one or more members 106a-106n may be contacted from the mobile device 102, the user, or in any other way to contact the one or more members 106a-106n. For example, the user may send a written document, a notification, an alert, electronic message, telephone message, e-mail, text message, instant message, or any other notification mechanism.

Optionally, at step 370, the one or more members 106a-106n having the same or similar preference as the user are located. The user may use the mobile device 102 to locate the one or more members 106a-106n. The one or more members 106a-106n and the user may try to locate each other so they can socially network. The user may locate the one or more members 106a-106n by engaging in a form of electronic communication. The user may locate the one or more members 106a-106n by using the social networking profile provided by the one or more members 106a-106n. The social networking profile may include information sufficient for the user to locate the one or more members 106a-106n. The user may locate the one or more members 106a-106n using GPS and/or Internet-based technology. In an exemplary embodiment, the user may receive electronically a guide, directions, a map or the like that may assist the user to locate the one or more members 106a-106n.

Figure 6:
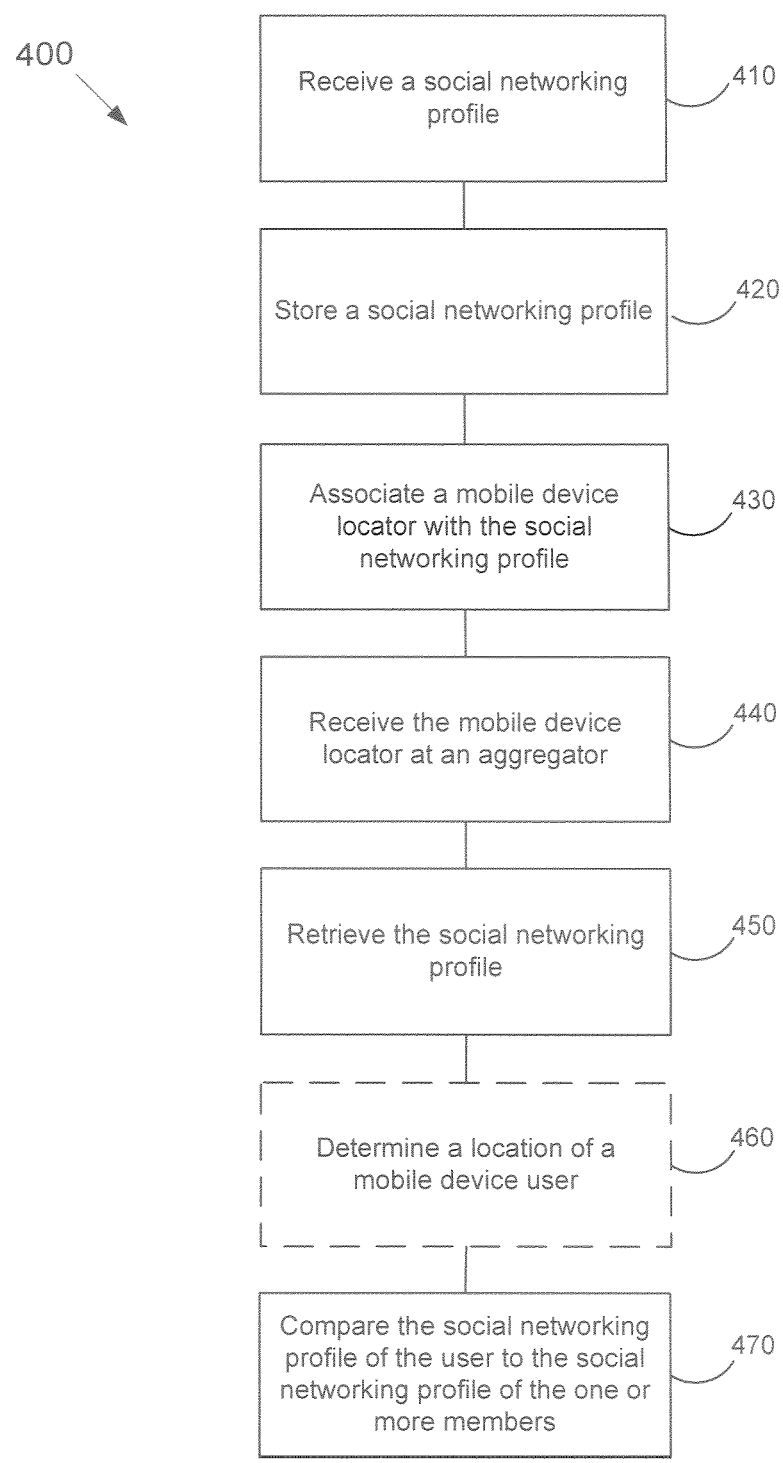
FIG. 6 depicts an exemplary flow chart which illustrates an exemplary method for mobile social networking within a target area according to various embodiments of the disclosure.

FIG. 6 illustrates an exemplary flow chart which illustrates an exemplary method 400 for mobile social networking within a target area according to various embodiments of the disclosure. At block 410, a social networking profile may be received. As described above, the social networking profile may include user preferences, a target area, and other social networking information. In some embodiments, the social networking profile may include a mobile device locator. Also, as described above, the social networking profile may be received using a user interface. At block 420, the social networking profile may be stored. The social networking profile may be stored in the mobile device 102, at the aggregator 110, or using any other means.

At block 430, a mobile device locator may be associated with the social networking profile. The aggregator 110 may associate the mobile device locator and the social networking profile. In some embodiments, the mobile device 102 may associate the social networking profile and the mobile device locator. A computer executable application may associate the mobile device locator and the social networking profile. The mobile device locator may be a phone number, a serial number, an identifier, and the like. At block 440, the aggregator may receive the mobile device locator. The mobile device user may broadcast the mobile device locator to the aggregator 110.

At block 450, the social networking profile may be retrieved. The aggregator 110 may retrieve the social networking profile from the mobile device locator. In some instances, the aggregator 110 may retrieve the social networking profile from an aggregator database using the associated mobile device locator.

Optionally, at block 460, a location of a mobile device user may be determined. The location of the mobile device user may be determined using the mobile device locator. The aggregator may determine the location of the mobile device using the mobile device locator. The aggregator may be able to track the mobile device user's location using the mobile device locator.

At block 470, the social networking profile of a user may be compared to a social networking profile of the one or more members 106a-106n of the social network within the target area to determine whether the one or members has a preference that is the same or similar to the at least one user preference. The aggregator 110 may compare the social networking profiles of the mobile device user and the one or more members 106a-106n.

The embodiments of the present invention are not to be limited in scope by the specific embodiments described herein. Thus, such modifications are intended to fall within the scope of the following appended claims. Further, although some of the embodiments of the present invention have been described herein in the context of a particular implementation in a particular environment for a particular purpose, those of ordinary skill in the art should recognize that its usefulness is not limited thereto and that the embodiments of the present invention can be beneficially implemented in any number of environments for any number of purposes. Accordingly, the claims set forth below should be construed in view of the full breadth and spirit of the embodiments of the present invention as disclosed herein. While the foregoing description includes many details and specificities, it is to be understood that these have been included for purposes of explanation only, and are not to be interpreted as limitations of the invention. Many modifications to the embodiments described above can be made without departing from the spirit and scope of the invention.

The invention claimed is:

1. A method for updating a mobile social network, comprising:
receiving a first social networking profile of a user of a first mobile computing device, the first social networking profile comprising at least one user preference;
determining a target area based on at least one of a current location of the user of the first mobile computing device, a previous location of the user, or a predicted location of the user;
receiving, via a communications network, one or more second social networking profiles associated with respective one or more members of a social network, each social networking profile associated with the one or more members including respective preference data of the one or more members;
receiving location information corresponding to a current location of respective members of the one or more members;
comparing the received location information and preference data of the one or more members of the social network to the target area and the at least one user preference to determine a mobile social network member of the mobile social network within the target area having a preference corresponding to the at least one user preference of the user of the first mobile computing device;
automatically transmitting a notification to the mobile social network member;
receiving updated location information corresponding to an updated current location of respective members of the one or more members;
dynamically removing a first mobile social network member of the mobile social network from the mobile social network in response to determining that the updated current location of the first mobile social network member is not within the target area;
dynamically adding a new mobile social network member to the mobile social network within the target area in response to determining that the updated current location of the new mobile social network member is within the target area, the new mobile social network member having a preference corresponding to the at least one user preference of the user of the first mobile computing device; and
automatically transmitting a notification to the new mobile social network member within the target area.

2. The method of claim 1, further comprising determining the current location of the one or more members of the social network by deriving the current location of the one or more members from the one or more second social networking profiles of the one or more members.

3. The method of claim 2, wherein the current location of the one or more members of the social network in the one or more second social networking profiles is updated by at least one of GPS technology and Internet-based technology.

4. The method of claim 1, wherein the current location of the user is determined using latitude and longitude coordinates of the user.

5. The method of claim 1, wherein determining that the mobile social network member is within the target area comprises comparing the current location of the one or more members relative to the current location of the user.

6. The method of claim 1, further comprising:
receiving a communication, via the communications network, that the mobile social network member is within the target area.

7. The method of claim 1, further comprising indicating the current location of the mobile social network member based on the location information.

8. The method of claim 7, wherein indicating the current location of the mobile social network member comprises displaying a representation of the mobile social network member on an electronic map of the first mobile computing device.

9. The method of claim 8, wherein the electronic map comprises at least one of a guide and directions to the mobile social network member.

10. The method of claim 1, wherein the first social networking profile comprises the current location of the user.

11. A mobile device for accessing a mobile social network, the mobile device comprising:
one or more processors;
at least one memory having stored thereon:
a first social networking profile of a user of the mobile device, the first social networking profile comprising at least one user preference, and computer program code that, when execute by the one or more processors, controls the one or more processors to:
  access the first social networking profile; and
  determine a target area based on at least one of a current location of the user, a previous location of the user, or a predicted location of the user;
a first interface in communication with the one or more processors and configured to transmit the first social networking profile, via a communications network, to an intermediary network computing system; and
a search processor configured to connect to the intermediary network computing system to communicate the target area as part of a search for one or more members of a social network connected to the communications network to determine a mobile social network member of the mobile social network;
wherein the intermediary network computing system is configured to:
  compare location information of the one or more members and preference data of the one or more members to the target area and the at least one user preference to determine the mobile social network member within the target area within the target area having a preference corresponding to the at least one user preference of the user;
  automatically transmit a notification to the mobile social network member;
  dynamically remove a first mobile social network member from the mobile social network in response to determining that updated current location of the first mobile social network member is not within the target area;
  dynamically add a new mobile social network member to the mobile social network in response to determining that updated current location of the new mobile social network member is within the target area, the new social network member having a preference corresponding to the at least one user preference of the user; and
  automatically transmit a notification to the new mobile social network member within the target area.

12. The mobile device of claim 11, wherein the intermediary network computing system is further configured to determine the current location of the one or more members of the social network by deriving the current location of the one or more members from one or more second social networking profiles of the one or more members.

13. The mobile device of claim 12, wherein the current location of the one or more members of the social network in the one or more second social networking profiles is updated by at least one of GPS technology and Internet-based technology.

14. The mobile device of claim 11 further comprising:
a second interface configured to enable contact with the mobile social network member by receiving a notification of the mobile social network member and a method of contact and allowing transmission of a message to the mobile social network member over the communications network using the method of contact.

15. The mobile device of claim 11, wherein determining that the mobile social network member is within the target area comprises comparing the current location of the one or more members relative to the current location of the user.

16. The mobile device of claim 11, wherein the first interface is further configured to generate a notification on the mobile device that the mobile social network member is within the target area.

17. A computer-implemented method for updating a mobile social network:
receiving a first social networking profile of a user of a first mobile computing device, the first social networking profile comprising at least one user preference;
determining a target area based on at least one of a current location of the user of the first mobile computing device, a previous location of the user, or a predicted location of the user;
receiving, via a communications network, one or more second social networking profiles associated with respective one or more members of a social network, each social networking profile associated with the one or more members including respective preference data of the one or more members;
receiving location information corresponding to a current location of respective members of the one or more members;
comparing the received location information and preference data of the one or more members of the social network to the target area and the at least one user preference to determine a mobile social network member of the mobile social network within the target area having a preference corresponding to the at least one user preference of the user of the first mobile computing device;
automatically transmitting a notification to the mobile social network member;
receiving updated location information corresponding to an updated current location of respective members of the one or more members;
dynamically removing a first mobile social network member of the mobile social network from the mobile social network in response to determining that the updated current location of the first mobile social network member is not within the target area;
dynamically adding a new mobile social network member to the mobile social network within the target area in response to determining that the updated current location of the new mobile social network member is within the target area, the new mobile social network member having a preference corresponding to the at least one user preference of the user of the first mobile computing device; and
automatically transmitting a notification to the new mobile social network member within the target area.

18. The method of claim 17, further comprising determining the current location of the one or more members of the social network by deriving the current location of the one or more members from the one or more second social networking profiles of the one or more members.

19. The method of claim 1, wherein determining the current location of the one or more members of the social network comprises receiving the current location of the one or more members of the social network from corresponding social networking profiles of the one or more members of the social network.

20. The method of claim 19, wherein the current location of the one or more members of the social network in the corresponding social networking profiles is updated by at least one of GPS technology and Internet-based technology.

* * * * *